Figure 1:
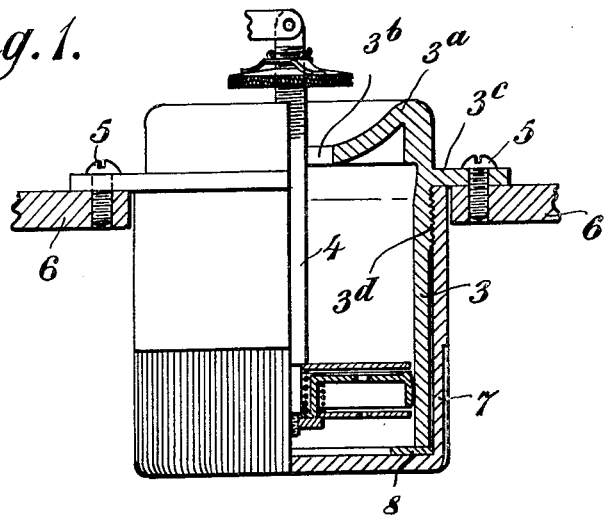

June 26, 1934.  W. TIMSON  1,964,186

DASHPOT

Filed May 27, 1933

Inventor: William Timson.
Per:- George E. Folkes.
Attorney.

Patented June 26, 1934

1,964,186

UNITED STATES PATENT OFFICE 1,964,186

DASHPOT

William Timson, Birmingham, England, assignor to W. & T. Avery Limited, Birmingham, England Application May 27, 1933, Serial No. 673,166
In Great Britain June 4, 1932

3 Claims. (Cl. 188—96)

This invention has reference to improvements relating to dashpots and is concerned more particularly with liquid dashpots of the kind commonly employed in conjunction with weighing apparatus.

In connection with weighing apparatus it is the more general practice to fix the dashpot to the weighing apparatus during assembly but this course is open to the objections that if the dashpot is filled before the scale is despatched from the place of assembly there is a risk of the loss of the damping liquid in the event of the scale being tilted or overturned during transit and that if the dashpot is sent out empty the subsequent filling of the dashpot usually requires the services of a skilled individual since more often than not the general design of the apparatus requires that the dashpot should be located in a relatively inaccessible position.

The present invention has for its object the provision of an improved dashpot which permits of a scale being assembled and despatched in a substantially completed condition and which admits of the dashpot being readily adapted for use when required without the attendance of the objections hereinbefore referred to.

The invention consists of an improved liquid dashpot characterized in that the dashpot cylinder is surrounded by a readily removable container into which the damping fluid is initially poured and from which it passes into the cylinder when the container is secured in the enveloping position and into which the said liquid falls when the container is removed.

The invention further resides in the details of construction of the improved liquid dashpot for use with weighing scales to be described hereinafter.

The invention will now be described with particular reference to the accompanying sheet of drawing which illustrates the invention in its application to a liquid dashpot of the piston and cylinder type adapted for use with weighing scales of known kind.

In the drawing:—

Figure 2:
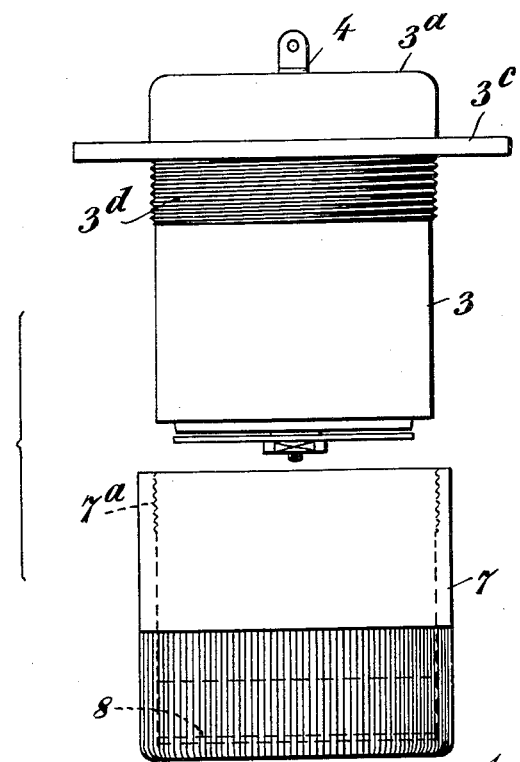

Figure 1 is a part sectional elevation of the dashpot in the assembled condition, and Figure 2 is a view showing the container separated from the dashpot cylinder.

In the embodiment of the invention illustrated in the drawing the improved dashpot comprises a cylinder 3 which is open at the lower end and provided with a non-spillable top 3$^a$, of known kind, having in the centre thereof an aperture 3$^b$ through which the piston rod 4 projects. Adjacent to the upper end the cylinder 3 is provided with a flange 3$^c$ carrying oppositely disposed lugs having therein holes through which may be passed bolts or screws 5 for securing the cylinder 3 to the scale framework 6. Below the said flange 3$^c$ the cylinder 3 is provided with a screw threaded portion 3$^d$ which co-operates with a correspondingly tapped portion 7$^a$ formed in the upper portion of the inner wall of a cylindrical container 7 which is closed at the lower end, the inner diameter of the said container 7 being slightly in excess of the external diameter of the cylinder 3.

The container 7 does not require to be accurately machined and may be conveniently formed by a moulding process from a mouldable plastic substance of the phenol aldehyde condensation product type.

When the container 7 is in position on the cylinder 3 the lower end of the cylinder 3 is forced into contact with a resilient washer 8 located in the bottom of the container 7 in order to constitute a liquid-proof seal.

It will be seen that with a dashpot constructed as hereinbefore described the dashpot cylinder 3 may be fixed in position during the assembly and the piston rod 4 attached to the part 6 of the scale to which it has to be connected since when it is required to bring the scale into use it is only necessary to remove the liquid container 7 from the dashpot cylinder 3 to pour thereinto the desired quantity of liquid and then to re-attach the container 7 to the cylinder 3 so that the damping liquid is forced from the interior of the container 7 into the cylinder 3 the bottom of the container 7 in conjunction with the washer 8 serving as the closure means for the lower open end of the cylinder 3.

Furthermore, the container 7 can be attached to the dashpot cylinder 3 without involving any dismantling of the scale and without the use of tools by a relatively unskilled individual.

What I claim is:—

1. A liquid dashpot incorporating a dashpot cylinder open at its lower end, a piston adapted for reciprocation within said cylinder, an open topped enveloping container which serves to receive the damping liquid, said liquid when the container is secured to the cylinder in the enveloping position being transferred to the interior of the cylinder and falling into the container when the said container is removed, and means for ensuring a liquid-tight seal between the container and the cylinder when the container is secured in the enveloping position.

2. A liquid dashpot incorporating a dashpot cylinder open at its lower end, a piston adapted to reciprocate within said piston, an open topped container adapted to envelop the dashpot cylinder, said container having the charge of damping liquid poured thereinto, means for readily securing and detaching the container to and from the dashpot cylinder whereby upon attaching the container to the cylinder the charge of damping liquid within the container is transferred to the damping cylinder and received from the dashpot cylinder when the container is removed and a resilient washer located in the bottom of the container and adapted to contact with the end of the dashpot cylinder when the container is secured in the enveloping position thereby providing a liquid-proof seal between the dashpot and the container.

3. A liquid dashpot incorporating a dashpot cylinder open at its lower end, means for attaching said cylinder to a framework, a piston reciprocably mounted within said cylinder, an open topped container having an internal diameter slightly greater than the external diameter of the cylinder whereby the container may be caused to envelop said cylinder, means for securing the container in the enveloping position and means for obtaining a liquid-proof seal between the container and the cylinder, said container being adapted to receive a charge of damping liquid which, when the container is being secured in the enveloping position, is transferred into the interior of the dashpot cylinder and which when the container is being removed recollects in the container.

WILLIAM TIMSON.